(12) United States Patent
Kaneko et al.

(10) Patent No.: US 8,156,817 B2
(45) Date of Patent: Apr. 17, 2012

(54) PRESSURE DETECTION DEVICE

(75) Inventors: Mitsuru Kaneko, Hiroshima (JP); Aki Kitani, Hiroshima (JP)

(73) Assignee: JMS Co., Ltd, Hiroshima (JP)

( * ) Notice: Subject to any disclaimer, the term of this patent is extended or adjusted under 35 U.S.C. 154(b) by 903 days.

(21) Appl. No.: 12/280,899

(22) PCT Filed: Mar. 29, 2006

(86) PCT No.: PCT/JP2006/306475
§ 371 (c)(1),
(2), (4) Date: Aug. 27, 2008

(87) PCT Pub. No.: WO2007/110946
PCT Pub. Date: Oct. 4, 2007

(65) Prior Publication Data
US 2009/0007683 A1    Jan. 8, 2009

(51) Int. Cl.
*G01L 9/10*    (2006.01)
(52) U.S. Cl. ........... 73/728; 73/715; 73/722; 73/861.08; 73/861.11; 361/283.4
(58) Field of Classification Search .......... None
See application file for complete search history.

(56) References Cited

U.S. PATENT DOCUMENTS

| | | | | |
|---|---|---|---|---|
| 4,206,762 A | * | 6/1980 | Cosman | 600/438 |
| 4,292,850 A | * | 10/1981 | Bachem | 73/702 |
| 4,658,644 A | * | 4/1987 | Coesfeld et al. | 73/146.8 |
| 4,660,568 A | * | 4/1987 | Cosman | 600/561 |
| 4,827,092 A | * | 5/1989 | Kobold | 200/81.9 M |
| 4,951,509 A | | 8/1990 | Yamauchi | |
| 5,146,165 A | | 9/1992 | Brown | |
| 5,165,284 A | * | 11/1992 | Shoji et al. | 73/728 |
| 5,392,653 A | | 2/1995 | Zanger et al. | |
| 6,898,984 B2 | * | 5/2005 | Schob | 73/861.08 |
| 6,976,964 B2 | | 12/2005 | Chevallet et al. | |
| 7,137,307 B2 | * | 11/2006 | Huybrechts et al. | 73/861.12 |
| 7,547,480 B2 | * | 6/2009 | Chung et al. | 428/811.1 |
| 7,578,202 B2 | * | 8/2009 | Huybrechts et al. | 73/861.12 |
| 2002/0028155 A1 | | 3/2002 | Dolecek et al. | |

FOREIGN PATENT DOCUMENTS

JP          7-40191          9/1995

(Continued)

OTHER PUBLICATIONS

Search report from E.P.O., mail date is Jul. 4, 2011.

(Continued)

*Primary Examiner* — Lisa Caputo
*Assistant Examiner* — Jermaine Jenkins
(74) *Attorney, Agent, or Firm* — Greenblum & Bernstein P.L.C.

(57) ABSTRACT

Provided is a pressure detection device capable of easy installation and removal of a sensor in/from a diaphragm, measurement of a pressure in a wide rage, and manufacture at a low cost while reducing a size. A sensor part (A) has: a magnet (12) being applied with a load produced by pressing of a diaphragm (8); and a magnet cap (11) covering the magnet (12). The diaphragm (8) has an intra-diaphragm magnetic body (9) buried therein. The intra-diaphragm magnetic body (9) has a protrusion part protruding from the diaphragm (8) so as to be in contact with the magnet (12). The magnet cap (11) has an opening part enabling the protrusion part of the intra-diaphragm magnetic body (9) and the magnet (12) to be joined together.

9 Claims, 7 Drawing Sheets

FOREIGN PATENT DOCUMENTS

| | | |
|---|---|---|
| JP | 740191 | 9/1995 |
| JP | 8-33332 | 3/1996 |
| JP | 9-288028 | 11/1997 |
| JP | 2002-513321 | 5/2002 |
| JP | 2002-257656 | 9/2002 |
| JP | 2004-012157 | 1/2004 |
| WO | 93/24817 | 12/1993 |
| WO | 96/40322 | 12/1996 |
| WO | 99/13926 | 3/1999 |

OTHER PUBLICATIONS

English language Abstract of JP 2002-513321, May 8, 2002.
English language Abstract of JP 2-55926, Feb. 26, 1990.
English language Abstract of JP 2002-257656, Sep. 11, 2002.
Partial English language translation of lines 14-15 of col. 4 and Fig. 1 of JP 7-40191, Dec. 12, 2010, (Feb. 12, 2010).

* cited by examiner

PRESSURE DETECTION DEVICE

TECHNICAL FIELD

The present invention relates to a pressure detection device that measures a pressure of a liquid flowing in a tube, without having an air space or a branch tube.

BACKGROUND ART

Conventionally, there have been proposed pressure detection devices that measure a pressure of a fluid flowing in a blood circuit used for dialysis, apheresis, Continuous Renal Replacement Therapy (CRRT), or the like, without having a chamber or a branch tube. Extracorporeal circulation of blood in heart surgery, emergency medical care, or the like needs various treatments, thereby increasing the number of circuits and devices. However, a space where the devices are located and a space where the located devices are used are limited. Therefore, such devices for heart surgery, emergency care, and the like which are utilized especially in emergency cases are desired to be easily handled. From this viewpoint, a diaphragm pressure sensor has been disclosed to easily measure a pressure of a fluid such as blood flowing in an extracorporeal circulation circuit.

For example, a pressure detection device used in devices for extracorporeal blood treatments has been disclosed to (i) be applied with a pressure of a fluid via a diaphragm that is provided at a surface of a tube channel in parallel to a direction of flowing the fluid, and (ii) detect, by a distortion gauge, a vertical movement of a presser pressed on the diaphragm as a power, and (iii) calculates a pressure value from the power based on an area applied with the pressure (refer to Patent Reference 1, for example). This pressure detection device is connected, as a cassette body, to a dedicated device.

Furthermore, a pressure detection station used in apheresis systems has been disclosed to (i) be applied with a pressure of a fluid via a diaphragm that is provided at a surface of a tube channel in parallel to a direction of flowing the fluid, and (ii) detect, by a distortion gauge, a vertical movement of a presser pressed on the diaphragm as a power, and (iii) calculates a pressure value from the power based on the power into a pressure value by calculation based on an area applied with the pressure (refer to Patent Reference 2, for example). This pressure detection station is connected to a dedicated device.

Still further, a liquid pressure detection structure has been disclosed to have (i) a tube body that is expanded and shrunk, (ii) a detection unit that detects an amount of the expanding and shrinking, and (iii) a joining unit that connects the tube body with the detection unit by easily installing and removing the detection unit in/from the tube body (refer to Patent Reference 3).

For these conventional diaphragm pressure sensors, a magnetic joining method has been conceived for easily joining and separating between the diaphragm and the sensor by freely installing and removing the sensor in/from the diaphragm. For examples of the joining method, the Patent Reference 2 and the Patent Reference 3 disclose technologies of joining a sensor to a diaphragm using a magnetic force.

[Patent Reference 1] Japanese Unexamined Patent Application Publication No. 2002-257656
[Patent Reference 2] Japanese Unexamined Patent Application Publication (Japanese Translation of PCT International Application) No. 2002-513321
[Patent Reference 3] Japanese Examined Patent Application Publication No. 8-33332

DISCLOSURE OF INVENTION

Problems that Invention is to Solve

In the meanwhile, measurement of a pressure in a wide range from a negative pressure to a positive pressure needs a strong joint between a diaphragm and a means (sensor) for detecting a displacement of the diaphragm, and continuance of the joint.

However, each structure of the conventional pressure detection devices and the like needs a large magnet to strongly join the diaphragm to the sensor using the magnetic joining method, which fails to reduce a size of the device. In order to realize both of the size reduction and the strong joint between and the diaphragm and the sensor, the conventional pressure detection device or the like needs a plate-shaped magnet having a thin thickness and a large area. In this case, the magnet would easily cause cracks or the like, thereby reducing reliability of a strength.

In order to realize the size reduction for the device, it is also possible to use a permanent magnet as a plate-shaped member buried in the diaphragm. However, such a permanent magnet is buried in the diaphragm, so that the plate-shaped member is exposed to a high temperature during forming the diaphragm. As a result, there is a possibility that the permanent magnet loses or reduces its magnetic force. In addition, the expensive permanent magnet causes a further problem of a high cost of the device.

Furthermore, restriction of a relative position where a diaphragm is joined to a presser is vital to keep an accuracy of the pressure detection. However, if the restriction is to be achieved by adjusting a shape of a magnet, it is necessary to manufacture a magnet having a special shape, which causes a problem of increase of a manufacturing cost.

Thus, the present invention addresses the above problems. It is an object of the present invention to provide a pressure detection device that can realize easiness of installation and removal of a sensor in/from a diaphragm, measurement of a pressure in a wide rage, a size reduction, and a low manufacturing cost.

It is another object of the present invention to provide a pressure detection device that can realize measurement of a pressure with a high accuracy, a size reduction, and a low manufacturing cost.

Means to Solve the Problems

In accordance with an aspect of the present invention for achieving the objects, there is provided a pressure detection device including: a diaphragm provided at a side surface of a tube body that is a transfer channel of a fluid; and a pressure detection part that detects a pressure from the diaphragm, wherein the pressure detection part includes: a magnet that is applied with a load produced by pressing of the diaphragm; and a covering member that is made of a magnetic material and covers the magnet, and the diaphragm includes a plate-shaped member that is made of a magnetic material and buried in the diaphragm, wherein the plate-shaped member includes a protrusion part that protrudes from the diaphragm so as to be in contact with the magnet, and the covering member includes an opening part that enables the protrusion part and the magnet to be joined together.

With the above structure, the pressure detection device according to the present invention can efficiently use magnetic field lines to strongly join the diaphragm to the sensor, while using a magnetic joining method which enables the sensor to be easily installed and removed in/from the diaphragm. As a result, the pressure detection device according to the present invention can measure a pressure in a wide range from a negative pressure to a positive pressure. Furthermore, with the above structure, the present invention can provide a pressure detection device with a small size, having excellent reliability of strength and a high accuracy of pressure detection, without using a large magnet. Still further, since an expensive permanent magnet is not necessary, the pressure detection device according to the present invention can be manufactured at a low cost, while reducing a size. Still further, with the structure, the opening part arranged in the covering member of the magnet restricts a relative position where the diaphragm is joined to the presser. As a result, the pressure detection device according to the present invention can increase an accuracy of pressure detection of the sensor, without increasing a cost.

The pressure detection part may be installed in and removed from the diaphragm reversibly, by magnetic jointing between the magnet and the protrusion part. With the above structure, the pressure detection device according to the present invention can install and remove, by a simple action, the reusable sensor part into/from the diaphragm that will be disposed together with a used blood circuit.

It is preferable that the pressure detection device further includes a pair of wall parts that vertically leads the magnet and the covering member to the diaphragm, wherein a distance between the pair of wall parts is shorter than a distance between two facing edges of a movable part of the diaphragm. In accordance with another aspect of the present invention for achieving the objects, there is provided a pressure detection device including: a diaphragm provided at a side surface of a tube body that is a transfer channel of a fluid; and a pressure detection part that detects a pressure from the diaphragm, wherein the pressure detection part includes a magnet that is applied with a load produced by pressing of the diaphragm, the diaphragm includes a plate-shaped member that is made of a magnetic material and buried in the diaphragm, and the pressure detection device further includes a pair of wall parts that vertically leads the magnet and the covering member to the diaphragm, wherein a distance between the pair of wall parts is shorter than a distance between two facing edges of a movable part of the diaphragm.

With the above structure, a pair of wall parts vertically leading the sensor part to the diaphragm serves as a stopper restricting a displacement of the diaphragm. As a result, the pressure detection device according to the present invention can prevent that the diaphragm is expanded, for example, and thereby being damaged, when the diaphragm in which the pressure detection part is not installed is applied with a sudden strong positive pressure.

Furthermore, since the pair of wall parts restricts a movement of the magnet, the pressure detection device according to the present invention can detect a pressure with a high accuracy.

The plate-shaped member may have a plurality of holes along a circle that is inside an outer circumference of the plate-shaped member and that has a same center as a center of the outer circumference, and the plurality of holes may be provided with a member to join the plate-shaped member to the diaphragm, thereby integrating the plate-shaped member to the diaphragm.

It should be noted that the present invention can be realized not only as the pressure detection device, but also as a pressure detection method. That is, in accordance with still another aspect of the present invention for achieving the objects, there is provided a pressure detection method of detecting a pressure from a diaphragm provided at a side surface of a tube body that is a transfer channel of a fluid, the pressure detection method including detecting a load using a magnet, the load being produced by pressing of the diaphragm, wherein the magnet is covered with a covering member made of a magnetic material, a plate-shaped member made of a magnetic material is buried in the diaphragm and has a protrusion part protruding from the diaphragm so as to be in contact with the magnet, the covering member includes an opening part that enables the protrusion part and the magnet to be joined together, and the detecting includes joining the protrusion part to the magnet, so as to detect the pressure from the diaphragm. In accordance with still another aspect of the present invention for achieving the objects, there is provided a pressure detection method of detecting a pressure from a diaphragm provided at a side surface of a tube body that is a transfer channel of a fluid, the pressure detection method including detecting a load using a magnet, the load being produced by pressing of the diaphragm, wherein a plate-shaped member made of a magnetic material is buried in the diaphragm, a movement of the magnet is restricted by a pair of wall parts to vertically lead the magnet to the diaphragm, and a distance between the pair of wall parts is shorter than a distance between two facing edges of a movable part of the diaphragm, and the detecting includes: restricting the movement of the magnet; and thereby joining the diaphragm to the magnet, so as to detect the pressure from the diaphragm.

Effects of the Invention

The pressure detection device according to the present invention can efficiently use magnetic field lines to strongly join a diaphragm to a sensor, while using the magnetic joining method. As a result, the pressure detection device enables the sensor to be easily installed and removed in/from the diaphragm, and can measure a pressure in a wide range. In addition, the pressure detection device according to the present invention that can perform correct pressure detection can be manufactured at a low cost, while reducing a size. Furthermore, the pressure detection device according to the present invention can prevent damage on the diaphragm, thereby detecting a pressure with a high accuracy.

Accordingly, the present invention is highly suitable for practical use, in recent days the importance of the extracorporeal blood treatments such as dialysis has been increased.

NUMERICAL REFERENCES

Figure 1:
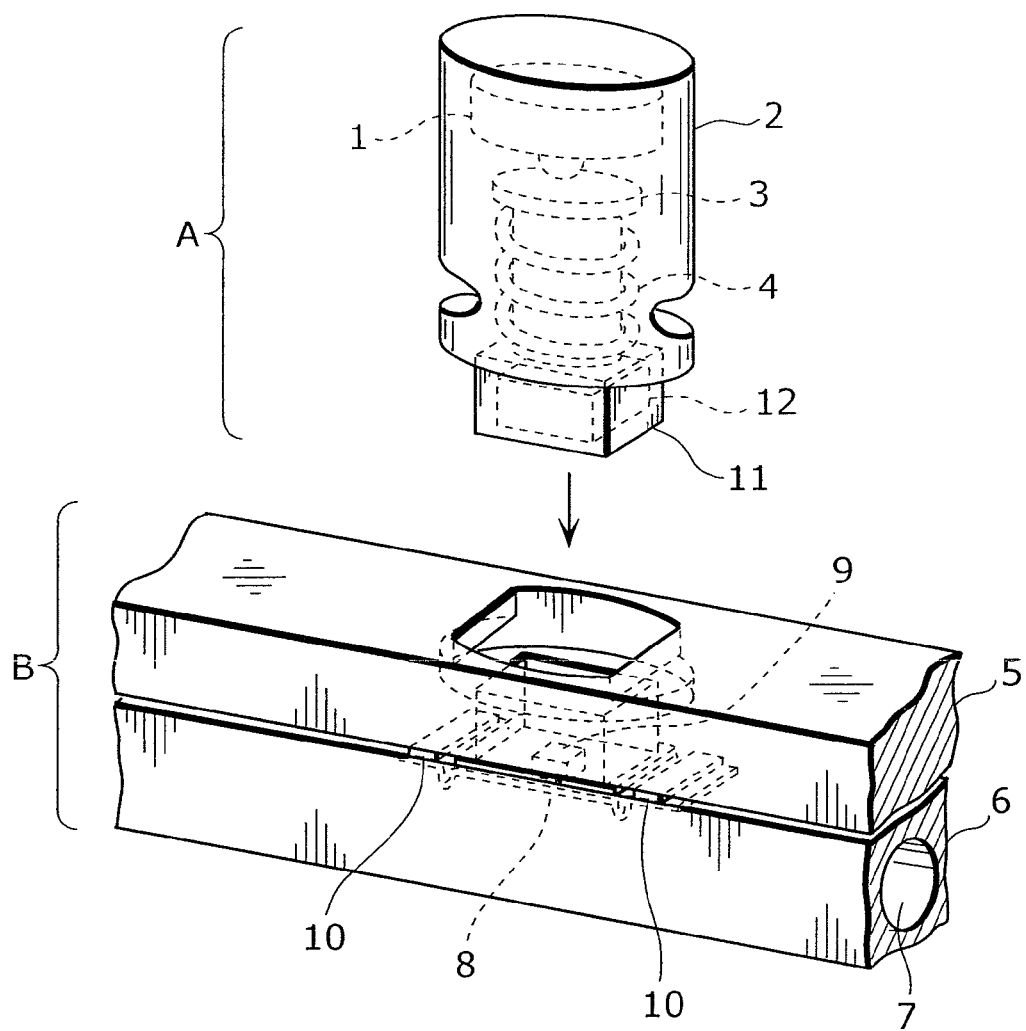
FIG. 1 is a perspective external view of a pressure detection device according to an embodiment of the present invention.

A sensor part
B disposable part
1 load cell
2 sensor chassis
2a, 5a engagement part
3 presser
4 spring
5 disposable-part upper chassis
5b wall part
6 disposable-part lower chassis
7 fluid channel
8 diaphragm
9 intra-diaphragm magnetic body
10 ring
11 magnet cap
12 magnet
13 guide

BEST MODE FOR CARRYING OUT THE INVENTION

The following describes a preferred embodiment according to the present invention with reference to the drawings.

Firstly, an overall structure of the pressure detection device according to the present embodiment is described with reference to FIGS. 1 and 2.

Figure 2:
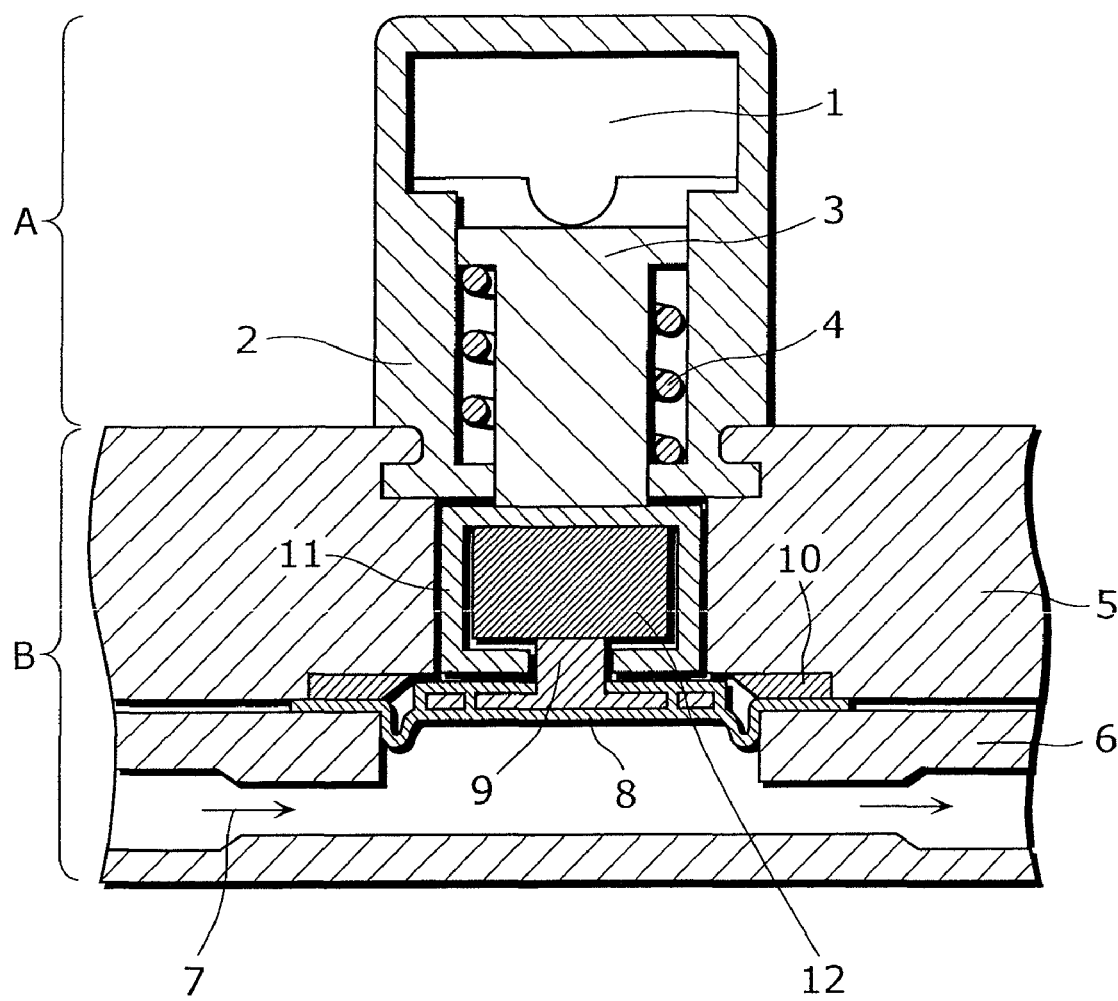
FIG. 2 is a cross-sectional view of the pressure detection device according to the embodiment of the present invention.

FIG. 1 is a perspective external view of the pressure detection device according to the present embodiment. FIG. 2 is a cross-sectional view of the pressure detection device according to the present embodiment.

The pressure detection device according to the present embodiment includes a sensor part A and a disposable part B. The sensor part A is inserted into and engaged with the disposable part B in a direction shown by an arrow in FIG. 1. The sensor part A is a sensor structure that detects a pressure. The sensor part A includes a load cell 1, a sensor chassis 2, a presser 3, a spring 4, a magnet cap 11, and a magnet 12. The disposable part B is a structure included in a blood circuit for which a pressure of flowing blood is detected. The disposable part B includes a disposable-part upper chassis 5, a disposable-part lower chassis 6, a diaphragm 8, an intra-diaphragm magnetic body 9, and a ring 10.

The load cell 1 is a pressure detector that converts a load transmitted via the presser 3, into an electric signal using a distortion gauge.

The sensor chassis 2 is a member having a hollow therein. In the hollow, there is the load cell 1, the presser 3, and the spring 4.

The presser 3 has one end connected to the load cell 1 and the other end connected to the magnet cap 11. The presser 3 is a member that moves upwards and downwards inside of the sensor chassis 2, and transmits the load from the magnet cap 11 to the load cell 1.

The spring 4 is an elastic member, such as a spring, that moves the presser 3 to apply the load onto the load cell 1.

The magnet cap 11 is a member made of a magnetic material and covers the magnet 12. The magnet cap 11 has one surface connected to the other end of the presser 3, and another surface having an opening for engaging the magnet 12 with the intra-diaphragm magnetic body 9 in the diaphragm 8.

The magnet 12 is engaged with the intra-diaphragm magnetic body 9 to be applied with the load from the diaphragm 8. The magnet 12 may be an electromagnet or the like.

The disposable-part upper chassis 5 is a member used to install the sensor part A into the disposable part B. The disposable-part upper chassis 5 leads the magnet cap 11 to be vertically contact with the diaphragm 8.

The disposable-part lower chassis 6 is a member included in a tube that is a fluid channel 7. The disposable-part lower chassis 6 has an opening part on a part of a side surface facing the disposable-part upper chassis 5 of the tube. In the opening part, the diaphragm 8 is provided.

Figure 3:
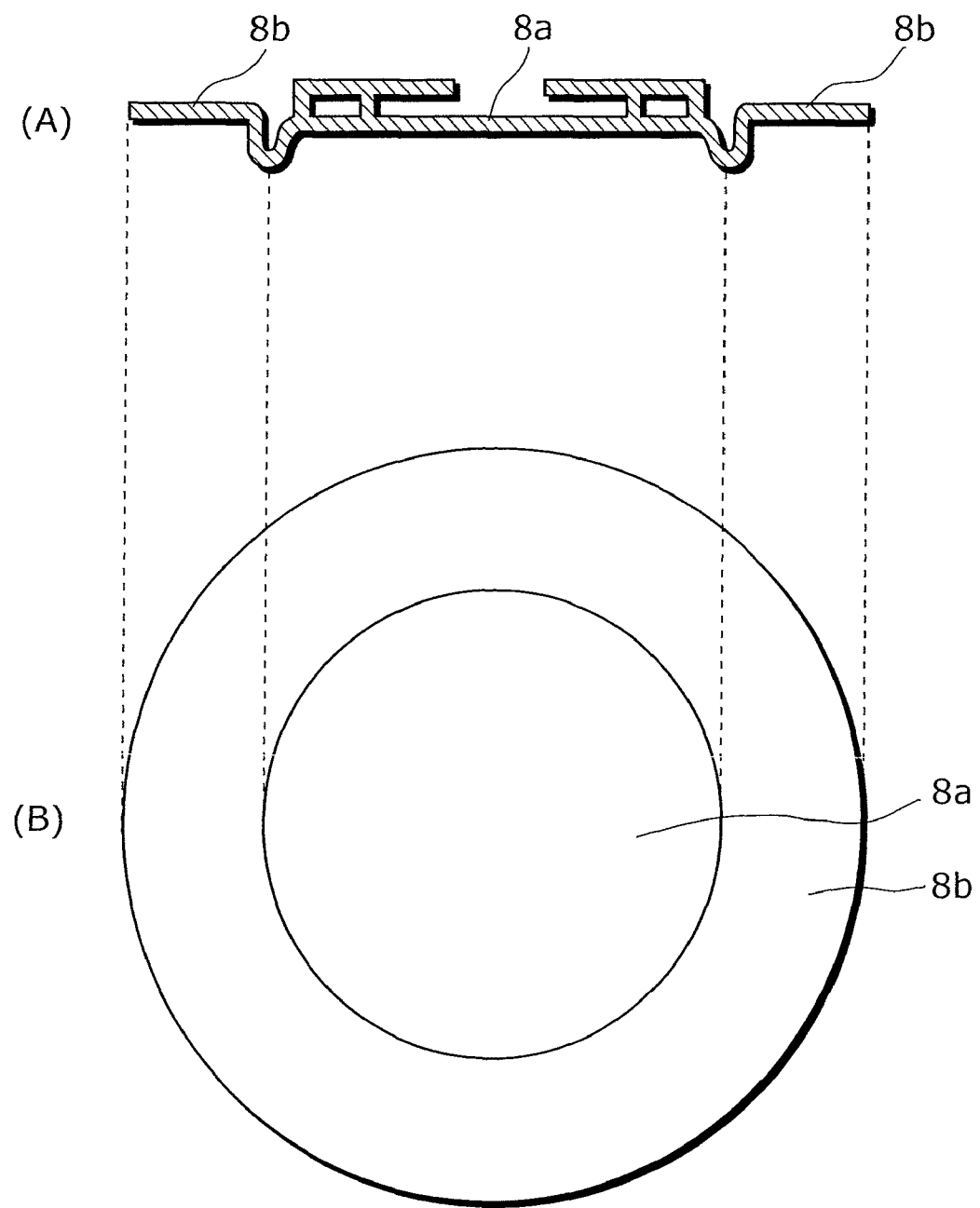
FIG. 3(A) is a cross-sectional view of a diaphragm 8.
FIG. 3(B) is a top plan view of the diaphragm 8.

The diaphragm 8 is a plate-shaped member that seals the opening part of the disposable-part lower chassis 6 and is displaced according to variations of a pressure of fluid flowing in the fluid channel 7, thereby applying load to the magnet 12. There is another case where the diaphragm 8 applies load to the magnet 12 by pressing, without being displaced. The diaphragm 8 is made of a synthetic rubber such as silicone or an isoprene rubber. As shown in the top view of FIG. 3(B), the diaphragm 8 includes a central part 8a and a peripheral part 8b. The central part 8a is harder than the peripheral part 8b. In the diaphragm 8, the intra-diaphragm magnetic body 9 is buried.

Figure 4:
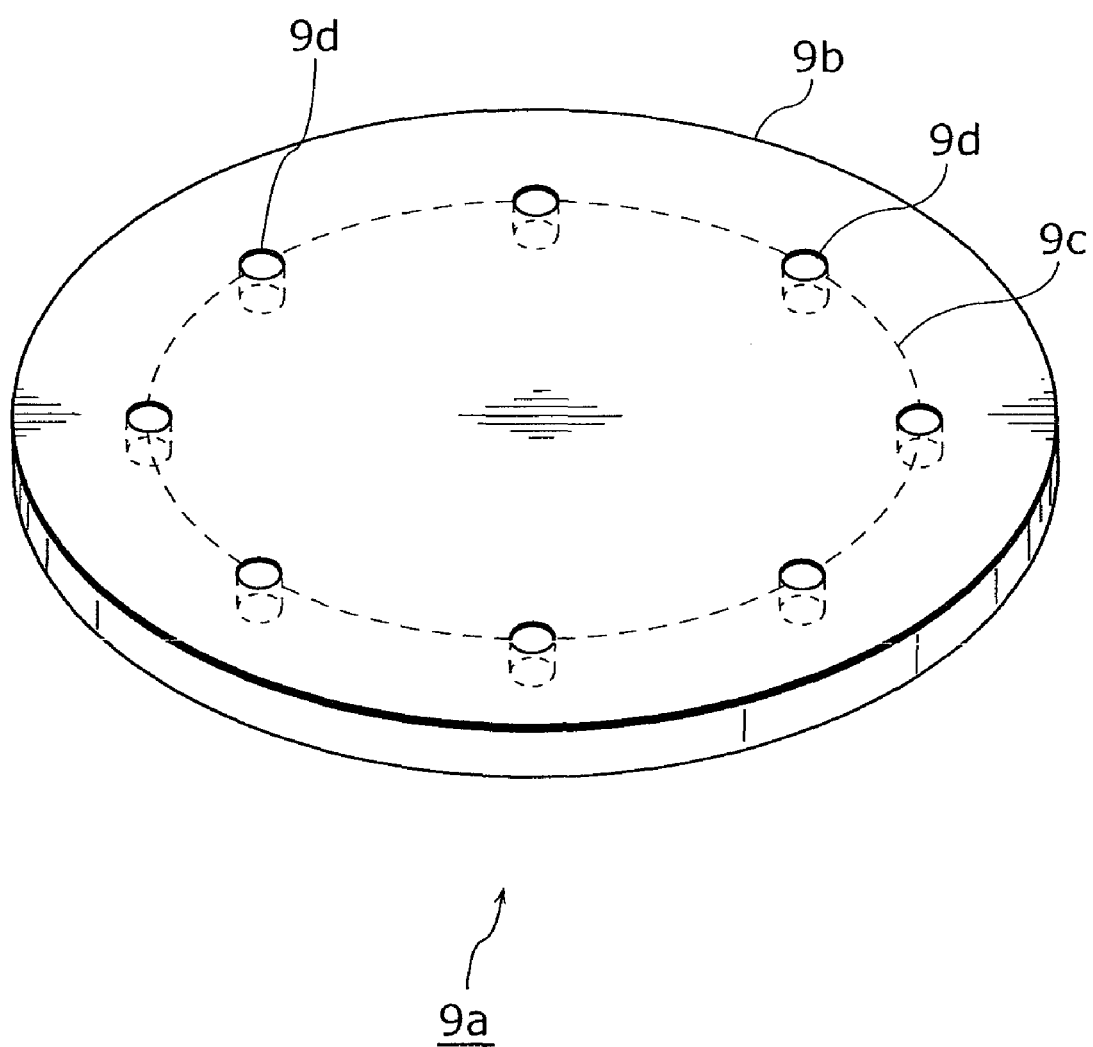
FIG. 4 is a perspective view of a plate-shaped part 9a of an intra-diaphragm magnetic body 9.

The intra-diaphragm magnetic body 9 is a plate-shaped member that is made of a magnetic material and buried in the diaphragm 8. A part of the intra-diaphragm magnetic body 9 vertically protrudes to contact the sensor part A. The intra-diaphragm magnetic body 9 has a plate-shaped part 9a of a disk shape as shown in FIG. 4 with eight holes 9d therein. The holes 9d are arranged equally spaced apart along a concentric circle 9c having the same center as a center of an outer circumference 9b. This plate-shaped part 9a of the intra-diaphragm magnetic body 9 is covered with a synthetic rubber material such as liquid silicone or an isoprene rubber, and the synthetic rubber material is hardened to integrate the plate-shaped part 9a to the diaphragm 8. Here, the synthetic rubber material located on and under the plate-shaped part 9a and the synthetic rubber material in the eight holes 9d realize strong integration of the intra-diaphragm magnetic body 9 to the diaphragm 8.

The ring 10 is a ring-shaped member that is gripped between the disposable-part upper chassis 5 and the disposable-part lower chassis 6, and fixes the diaphragm 8 by pressing the diaphragm 8 towards the disposable-part lower chassis 6. An end part of the ring 10 close to the protrusion part of the intra-diaphragm magnetic body 9 has a tapering shape tapering towards the wall parts 5b of the disposable-part upper chassis 5. A lower edge of the end part matches a periphery of a part of the diaphragm 8 vibrating in parallel to the fluid channel 7. The matching of the end part of the ring 10 and the periphery of the part (movable part) of the diaphragm 8 restricts a horizontal movement of the diaphragm 8.

The above dimensions (shape) can prevent outer projection (protrusion) of the diaphragm and damages due to the projection (protrusion), even if something causes a large positive pressure on a lumens of the blood circuit in which the pressure detection part is not installed. It should be noted that it is also possible in the pressure detection device, mechanism, or method according to the present invention that the pressure detection part of FIG. 1A is removed when pressure detection is not necessary, and installed as shown in FIG. 2 only when the pressure detection is performed. In the above case, the pressure detection part can be installed in the diaphragm (the protrusion part of the buried magnetic body 9) by a simple action, which is convenient.

Next, the features of the pressure detection device according to the present embodiment are described with reference to FIG. 5.

Figure 5:
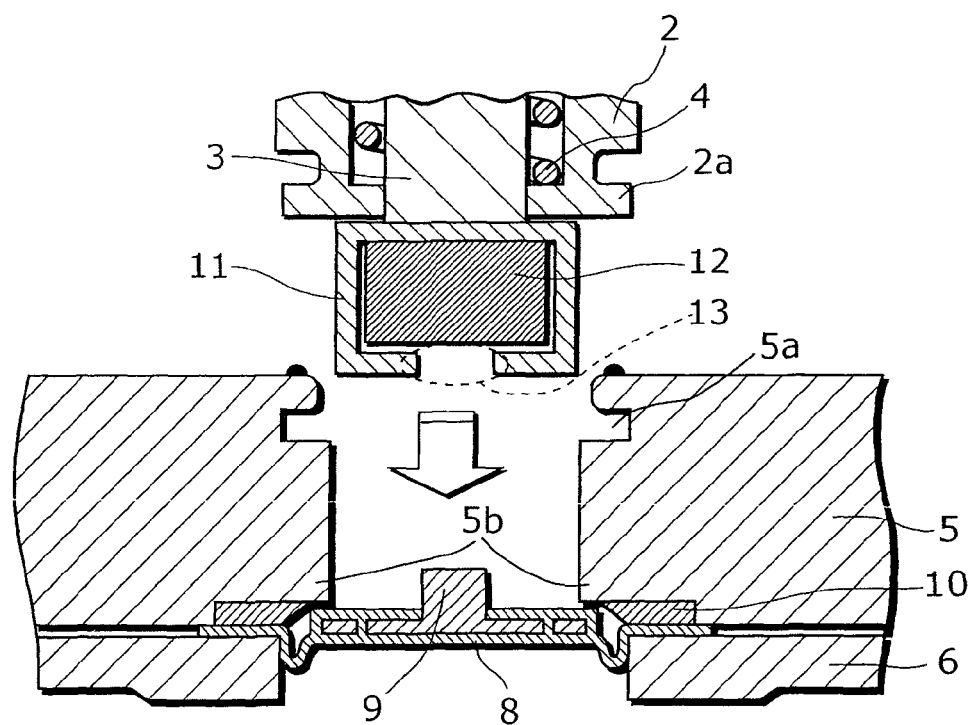
FIG. 5 is a partial cross-sectional view showing that a sensor A is being installed into a disposable part B.

FIG. 5 is a partial cross-sectional view showing that the sensor A is being installed into the disposable part B.

As described above, the sensor part A is inserted into the disposable part B in a direction shown by the arrow in FIG. 5. Here, the engagement part 2a of the sensor chassis 2 of the sensor part A is engaged with the engagement part 5a of the disposable-part upper chassis 5 of the disposable part B, thereby locking the sensor part A together with the disposable part B. This structure enables the sensor part A to be easily installed into the disposable part B.

Here, on a surface of the magnet cap 11 covering the magnet 12 where the magnet cap 11 contacts the diaphragm 8, a guide 13 that is an opening part for joining the protrusion part of the intra-diaphragm magnetic body 9 to the magnet 12 is provided. A diameter of the guide 13 is adjusted according to a diameter of the protrusion part of the intra-diaphragm magnetic body 9, so that the protrusion part can join with the diameter of the guide 13.

A distance between two facing wall parts 5b of the disposable-part upper chassis 5 is adjusted according to a shape and dimensions of the magnet cap 11, so that the wall parts 5b can lead the magnet cap 11 to be vertically contact with the diaphragm 8. Furthermore, the distance between the two facing wall parts 5b is adjusted to be shorter than a distance between facing edges (namely, facing edges of a part where the intra-diaphragm magnetic body 9 is buried, in FIG. 5) of the part (movable part) of the diaphragm 8 where the diaphragm 8 vibrates in a direction perpendicular to the fluid channel 7.

As described above, the magnet 12 is covered by the magnet cap 11, and only part of the magnet cap 11 where the magnet 12 contacts with the protrusion part of the intra-diaphragm magnetic body 9 is opened to form the guide 13. With this structure, magnetic field lines of the magnet 12 are converged in a cross section of the guide 13. Thereby, it is possible to improve a joining force joining the magnet 12 to the intra-diaphragm magnetic body 9. This means that, with the structure, magnetic field lines of the magnet 12 are efficiently used to exert a strong joining force on a limited contact area where the magnet 12 contacts the intra-diaphragm magnetic body 9, which makes it possible to measure a pressure in a wide range from a negative pressure to a positive pressure. In addition, with the above structure, since the magnet 12 does not need to be large to obtain the strong joining force, a size reduction of the pressure detection device can be achieved without reducing reliability of strength and an accuracy of pressure detection. Furthermore, with the simple structure of covering the magnet 12 with the magnet cap 11, the size reduction of the pressure detection device can be achieved at a low cost, without using an expensive material such as a permanent magnet.

In addition, the guide 13 in the magnet cap 11 can restrict a relative position between the magnet 12 and the intra-diaphragm magnetic body 9 being joined together. That is, this structure can prevent a displacement of the relative position between the magnet 12 and the diaphragm 8, and can keep a high accuracy of pressure detection of the sensor part A. Thereby, it is possible to realize a size reduction of the pressure detection device at a lower cost in comparison with the device using a magnet having a special shape, without reducing the accuracy of the pressure detection.

Furthermore, the distance between the two facing wall parts 5b of the disposable-part upper chassis 5 is adjusted to be shorter than the distance between the facing edges of the displacing part of the diaphragm 8. Thereby, the pair of the wall parts 5b serves as a stopper when the diaphragm 8 is displaced (more particularly, vibrates along the disposable-part lower chassis 6). As a result, an unexpected displacement of the diaphragm 8 can be restricted thereby further increasing an accuracy of the pressure detection.

It should be noted that appropriate selection of a material and a shape of the magnet cap 11 makes it possible to arbitrarily set a range of a measurable pressure, especially, a range of a measurable negative pressure.

Here, an effect of the use of the magnet cap 11 is described with reference to FIG. 6.

Figure 6:
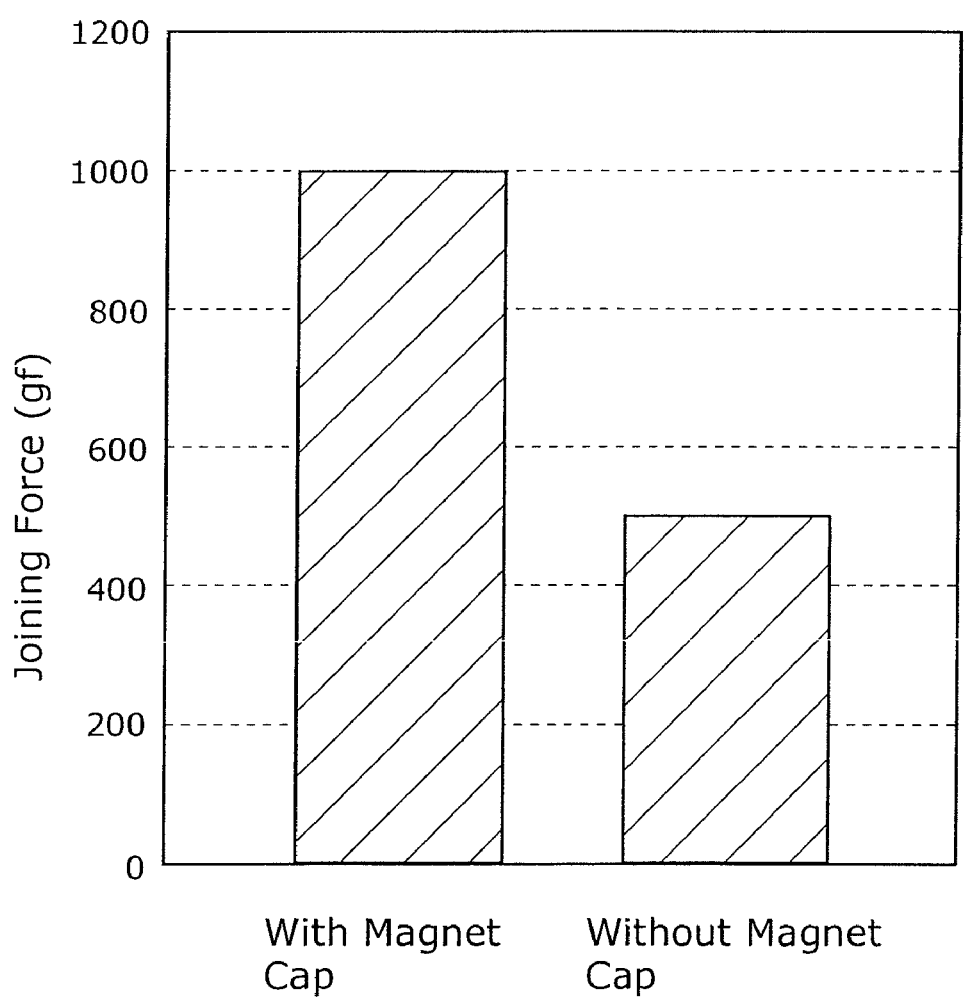
FIG. 6 is a graph showing an effect of use of a magnet cap.

FIG. 6 shows a graph plotting a difference in the joining force joining the magnet 12 to the intra-diaphragm magnetic body 9, between when the magnet cap 11 is used and when the magnet cap is not used.

As shown in FIG. 6, when the magnet cap 11 is used, approximately two times stronger joining force is exerted between the magnet 12 and the intra-diaphragm magnetic body 9, in comparison with when the magnet cap is not used. This means that the use of the magnet cap 11 to converge the magnetic field lines of the magnet 12 into the cross section of the guide 13 dramatically increases a joining force joining the magnet 12 to the intra-diaphragm magnetic body 9. Here, this graph shows a relationship between existence of the magnet cap 11 and the joining force, assuming that a thickness of the magnet cap 11 is 0.8 mm, a thickness of the magnet 12 is 5 mm, and a thickness of the protrusion part of the intra-diaphragm magnetic body 9 is 2.5 mm. It should be noted that these values are merely examples, and even different thicknesses result in the same difference in the effect of the existence of the magnet cap 11.

Moreover, the thickness of the protrusion part of the intra-diaphragm magnetic body 9 influences the joining force joining the magnet 12 to the intra-diaphragm magnetic body 9.

Figure 7:
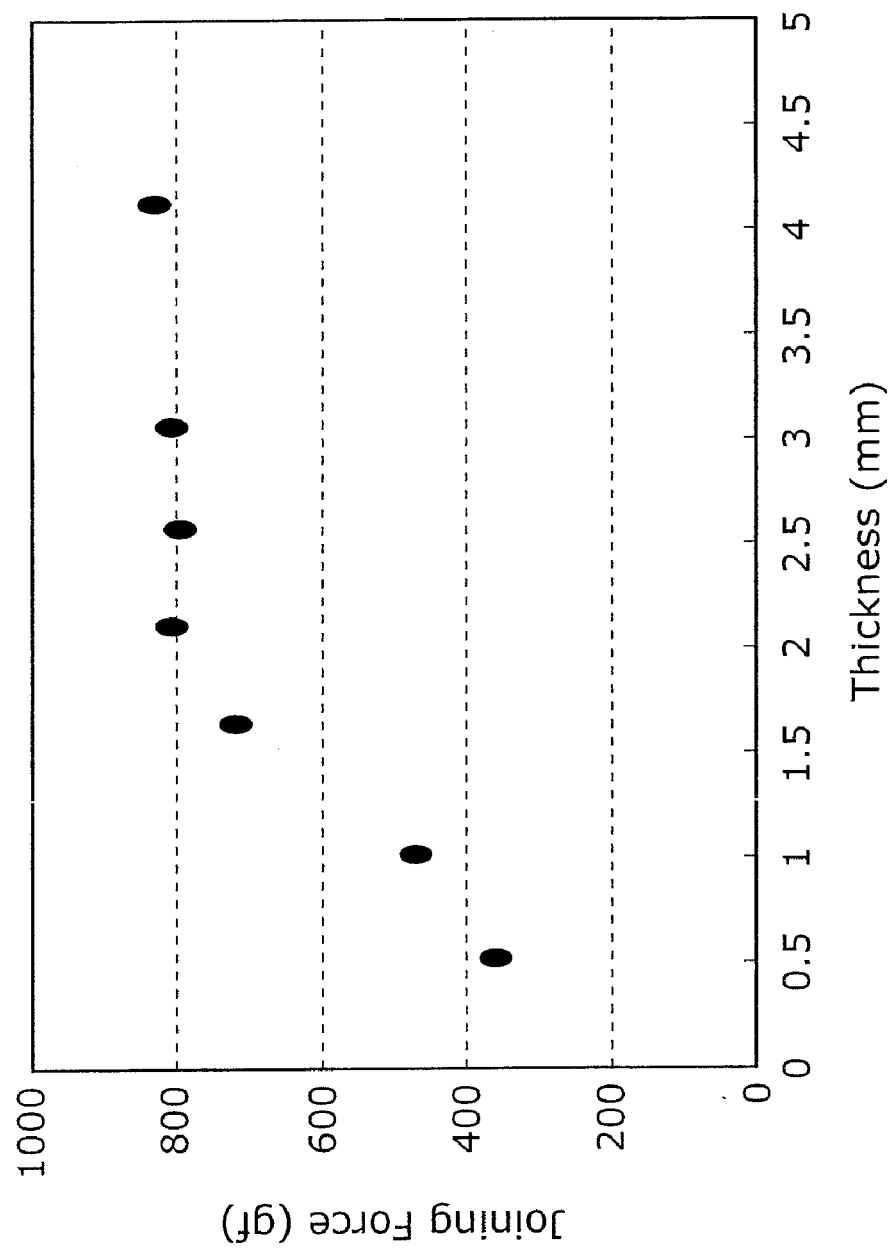
FIG. 7 is graph showing an effect of a thickness of the intra-diaphragm magnetic body onto a strength of magnetic joining force.

FIG. 7 is a graph showing an effect of the thickness of the protrusion part of the intra-diaphragm magnetic body 9 onto a strength of the magnetic joining force. FIG. 7 shows a relationship between the thickness of the protrusion part of the intra-diaphragm magnetic body 9 and the joining force, assuming that a thickness of the magnet 12 is 5 mm.

As shown in FIG. 7, the increase of the thickness of the protrusion part of the intra-diaphragm magnetic body 9 increases the joining force joining the magnet 12 to the intra-diaphragm magnetic body 9, up to 2 mm of the thickness. However, after exceeding 2 mm, the joining force is appropriately constant, even if the thickness is increased. This shows that the thickness of the protrusion part of the intra-diaphragm magnetic body 9 is preferably equal to or more than 2 mm, when the thickness of the magnet 12 is 5 mm.

It should be noted that the thickness of the protrusion part of the intra-diaphragm magnetic body 9 may be arbitrarily set depending on a desired joining force and a desired removing force.

Furthermore, a diameter of the protrusion part of the intra-diaphragm magnetic body 9 influences the joining force joining the magnet 12 to the intra-diaphragm magnetic body 9. Increase of the diameter of the protrusion part, in other words, increase of an area where the magnet 12 contacts the intra-diaphragm magnetic body 9, can increase the joining force joining the magnet 12 to the intra-diaphragm magnetic body 9. However, the increase of the area where the magnet 12 contacts the intra-diaphragm magnetic body 9 reduces sensitivity of the magnet 12, thereby reducing an accuracy of pressure detection. Therefore, the diameter of the protrusion part of the intra-diaphragm magnetic body 9 is arbitrarily set depending on a desired joining force and a desired accuracy of the pressure detection.

As described above, the pressure detection device according to the present embodiment, which has a simple structure in which the magnet 12 is covered with the magnet cap 11, efficiently uses magnetic field lines of the magnet 12 to strongly join the diaphragm 8 to the sensor part A. Thereby, the pressure detection device according to the present embodiment can measure a pressure in a wide range from a negative pressure to a positive pressure. In addition to the advantages of the magnetic joining method for the easiness in installing and removing the sensor part in/from the disposable part, there are other advantages of size reduction of the pressure detection device with a low cost while keeping a reliability of strength and a high accuracy of pressure detection. Still further, the magnet cap 11 has a shape to restrict a relative position between the magnet 12 and the diaphragm 8, which makes it possible to prevent damage on the diaphragm 8, and keep an accuracy of pressure detection of the sensor part without increasing a cost.

Although the exemplary embodiment of the pressure detection device according to the present invention has been described in detail above, those skilled in the art will be readily appreciate that many modifications are possible in the exemplary embodiment without materially departing from the novel teachings and advantages of the present invention. Accordingly, all such modifications are intended to be included within the scope of the present invention.

For example, it has been described in the present embodiment that the presser 3 is separated from the magnet cap 11, but the presser 3 may be integrated with the magnet cap 11.

Furthermore, it has been described in the present embodiment that the diaphragm 8 applies load onto the load cell 1, but it is also possible that the load cell 1 applies load to the diaphragm 8. In this case, the presser 3 and the spring 4 operate in an opposite direction to the direction in the embodiment.

INDUSTRIAL APPLICABILITY

The pressure detection device according to the present invention can be used as a device that measures a pressure of a fluid flowing in a blood circuit. The pressure detection device is suitable for measurement of a pressure of a fluid in a blood circuit used for dialysis, apheresis, or the like.

The invention claimed is:

1. A pressure detection device comprising: a diaphragm provided at a side surface of a tube body that is a transfer channel of a fluid; and a pressure detection part that detects a pressure from said diaphragm,
    wherein said pressure detection part includes:
    a magnet that is applied with a load produced by pressing of said diaphragm; and
    a covering member that is made of a magnetic material and covers said magnet, and
    said diaphragm includes a plate-shaped member that is made of a magnetic material and buried in said diaphragm,
    wherein said plate-shaped member includes a protrusion part that protrudes from said diaphragm so as to be in contact with said magnet, and
    said covering member includes an opening part that enables said protrusion part and said magnet to be joined together.

2. The pressure detection device according to claim 1, wherein said pressure detection part is installed in and removed from said diaphragm reversibly, by magnetic jointing between said magnet and said protrusion part.

3. The pressure detection device according to claim 1, further comprising
    a pair of wall parts that vertically leads said magnet and said covering member to said diaphragm,
    wherein a distance between said pair of wall parts is shorter than a distance between two facing edges of a movable part of said diaphragm.

4. A pressure detection device comprising: a diaphragm provided at a side surface of a tube body that is a transfer channel of a fluid; and a pressure detection part that detects a pressure from said diaphragm,
    wherein said pressure detection part includes a magnet that is applied with a load produced by pressing of said diaphragm,
    said diaphragm includes a plate-shaped member that is made of a magnetic material and buried in said diaphragm, and
    said pressure detection device further includes a pair of wall parts that vertically leads said magnet and said covering member to said diaphragm,
    wherein a distance between said pair of wall parts is shorter than a distance between two facing edges of a movable part of said diaphragm.

5. The pressure detection device according to claim 4,
    wherein said plate-shaped member has a plurality of holes along a circle that is inside an outer circumference of said plate-shaped member and that has a same center as a center of the outer circumference, and
    the plurality of holes are provided with a member to join said plate-shaped member to said diaphragm, thereby integrating said plate-shaped member to said diaphragm.

6. A pressure detection mechanism that detects a pressure from a diaphragm, said pressure detection mechanism comprising:
    a magnet that is applied with a load produced by pressing of said diaphragm; and
    a covering member that is made of a magnetic material and covers said magnet,
    wherein said diaphragm includes a plate-shaped member that is made of a magnetic material and buried in said diaphragm,
    said plate-shaped member includes a protrusion part protruding from said diaphragm so as to be in contact with said magnet, and
    said covering member includes an opening part that enables said protrusion part and said magnet to be joined together.

7. A pressure detection mechanism that detects a pressure from a diaphragm in which a plate-shaped member made of a magnetic material is buried, said pressure detection mechanism comprising:
    a magnet that is applied with a load produced by pressing of said diaphragm; and
    a pair of wall parts that vertically leads said magnet to said diaphragm,
    wherein a distance between said pair of wall parts is shorter than a distance between two facing edges of a movable part of said diaphragm.

8. A pressure detection method of detecting a pressure from a diaphragm provided at a side surface of a tube body that is a transfer channel of a fluid, said pressure detection method comprising
    detecting a load using a magnet, the load being produced by pressing of the diaphragm,
    wherein the magnet is covered with a covering member made of a magnetic material, a plate-shaped member made of a magnetic material is buried in the diaphragm and has a protrusion part protruding from the diaphragm so as to be in contact with the magnet, the covering member includes an opening part that enables the protrusion part and the magnet to be joined together, and said detecting includes joining the protrusion part to the magnet, so as to detect the pressure from the diaphragm.

9. A pressure detection method of detecting a pressure from a diaphragm provided at a side surface of a tube body that is a transfer channel of a fluid, said pressure detection method comprising detecting a load using a magnet, the load being produced by pressing of the diaphragm, wherein a plate-shaped member made of a magnetic material is buried in the diaphragm, a movement of the magnet is restricted by a pair of wall parts to vertically lead the magnet to the diaphragm, and a distance between the pair of wall parts is shorter than a distance between two facing edges of a movable part of the diaphragm, and said detecting includes: restricting the movement of the magnet; and thereby joining the diaphragm to the magnet, so as to detect the pressure from the diaphragm.

* * * * *